(12) United States Patent
Hiltgen et al.

(10) Patent No.: US 9,535,684 B2
(45) Date of Patent: *Jan. 3, 2017

(54) MANAGEMENT OF SOFTWARE UPDATES IN A VIRTUALIZED ENVIRONMENT OF A DATACENTER USING DEPENDENCY RELATIONSHIPS

(71) Applicant: VMware, Inc., Palo Alto, CA (US)

(72) Inventors: Daniel Kerry Hiltgen, Los Altos, CA (US); Christopher P. Devine, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,015

(22) Filed: Nov. 25, 2014

(65) Prior Publication Data

US 2015/0205596 A1 Jul. 23, 2015

Related U.S. Application Data

(63) Continuation of application No. 13/219,479, filed on Aug. 26, 2011, now Pat. No. 8,898,676.

(51) Int. Cl.
G06F 9/46 (2006.01)
G06F 9/455 (2006.01)
G06F 9/44 (2006.01)
G06F 9/445 (2006.01)

(52) U.S. Cl.
CPC . *G06F 8/65* (2013.01); *G06F 8/60* (2013.01); *G06F 9/45558* (2013.01); *G06F 2009/45562* (2013.01)

(58) Field of Classification Search
None
See application file for complete search history.

(56) References Cited

U.S. PATENT DOCUMENTS

| 6,681,391 | B1 * | 1/2004 | Marino | G06F 8/61 711/133 |
| 8,549,513 | B2 * | 10/2013 | Vinberg et al. | 717/174 |
| 8,615,768 | B2 | 12/2013 | Kwan et al. | |
| 8,627,289 | B2 * | 1/2014 | Farrell | G06F 8/71 714/2 |
| 2007/0234302 | A1 | 10/2007 | Suzuki et al. | |
| 2012/0081395 | A1 * | 4/2012 | Adi | G06F 8/63 345/634 |
| 2012/0222037 | A1 | 8/2012 | Labat et al. | |

* cited by examiner

*Primary Examiner* — Bing Zhao

(57) ABSTRACT

An approach to managing software components in a datacenter having virtualized components includes maintaining a suitable data construct for representing the virtualized elements. In embodiments, virtualized elements include knowledge relating to instantiations of virtual machines. Management of software components includes traversing a data representation of the datacenter, and assessing the compatibility of the software component with components in the datacenter that relate to the target of the software component.

19 Claims, 8 Drawing Sheets

MANAGEMENT OF SOFTWARE UPDATES IN A VIRTUALIZED ENVIRONMENT OF A DATACENTER USING DEPENDENCY RELATIONSHIPS

CROSS-REFERENCE TO RELATED APPLICATIONS

This application is a continuation of U.S. application Ser. No. 13/219,479 filed Aug. 26, 2011, which issued as U.S. Pat. No. 8,898,676 and is hereby incorporated by reference herein in its entirety.

BACKGROUND

Information technology (IT) administrators typically manage their organization's computer systems and associated components, such as telecommunications and storage systems in a facility commonly referred to as a datacenter. A large organization may include a wide range of hardware components (server machines, storage devices, communication equipment, and so on) and software components (firmware, operating systems, applications, and so on). Indeed, a large datacenter may be distributed over a wide geographic area in different parts of a city, in different states, or globally in different parts around the world. The term "datacenter" will be used herein to refer to the hardware and software components that constitute the computing, data storage, and communication infrastructure of an organization irrespective of whether the components are housed in a single building or distributed among different locations around the world.

Interrelationships between various parts of the datacenter may cause huge headaches for an IT department. In addition to managing large numbers of machines (servers, storage, and so on), differences between hardware, firmware, and software versions may easily create a combinatorial nightmare maintaining interoperability between hosts, databases, management appliances and other major software components. The combination of different hardware versions and software/firmware versions makes upgrading software in the datacenter a difficult process. If any one component does not upgrade successfully or becomes incompatible with other components as a result of the upgrade, entire portions of a datacenter may be rendered inoperable.

Further exacerbating the problem is the increasing deployment of virtualized environments within a datacenter. The term "virtualization" broadly describes the separation of a resource or request for a service from the underlying physical delivery of that service. Virtualization employs a software layer (virtualization layer) that decouples the physical hardware from the operating system. Virtualization allows multiple "virtual machines", with heterogeneous operating systems and applications to run in isolation, side-by-side on the same physical machine. A virtual machine is the representation of a physical machine by software. It has its own set of virtual hardware (e.g., RAM, CPU, NIC, hard disks, etc.) upon which an operating system and applications are loaded. The operating system sees a consistent, normalized set of hardware regardless of the actual physical hardware components.

FIG. 6 shows a computer system having standard hardware components such as CPU, main memory, network interface card (NIC), and disk storage. A software layer called the virtualization layer has direct access to the underlying hardware and presents a hardware interface that appears to be a machine (virtual machine) on which an operating system (OS) may be installed along with subsequent applications. With virtualization, managing software becomes more complicated because a single hardware platform no longer may be assumed to support only one OS with one set of drivers, but rather may have multiple instantiations of different OS's with different sets of drivers. In fact, multiple instances of the same OS may each have different versions of the same driver.

More recently, virtualization has progressed to encompass systems of computers that include multiple hardware platforms. FIG. 7, for example, shows an underlying layer of physical components including, for example, physical servers 702, storage systems 704, and network 706. Each physical server 702 may be configured with a virtual layer 712 to manage the components as a pool of resources that may be allocated as virtual machines 714. Each virtual machine may then be installed with any one of a number of OS's. The ESX Server is an example of a virtualization layer 712. The ESX Server software package may be installed on each physical servers 702 to abstract processor, memory, storage, and networking resources to be provisioned to multiple virtual machines 714. A number of similarly configured physical servers 702 may be grouped together with connections to the same network 706 and storage systems 704 to provide an aggregate set of resources in a virtual environment. A management server 716 may provide services such as access control, performance monitoring and configuration. The management server 716 may unify resources from the individual physical servers 702 to be shared among virtual machines in the virtual environment.

As datacenters become increasingly more modular, multi-tiered, distributed, and virtualized, the datacenter infrastructure becomes more complex and managing all the interrelated software components that make up the infrastructure becomes increasingly challenging. Dependencies between related components and the compatibility limitations between those components makes for a daunting task when IT administrators must patch or upgrade any components within the system.

SUMMARY

In embodiments, management of software components in a datacenter that includes a virtualized environment may include producing and maintaining a data construct that adequately represents datacenter components in virtualized architectures. Changing a software component on a target in the datacenter may include identifying, from the data construct, components in the datacenter related to the target. The action may proceed if none of the related components are deemed to be affected by the software component. In embodiments, if a related component is identified as being affected then the action may be denied, or a suitable warning may be presented to an IT administrator and the action suspended pending a response from the IT administrator.

In embodiments, changing a software component may include installing a software component or removing a software component.

In embodiments, the data construct representing the datacenter may be extended using probe processes.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of disclosed embodiments. Particular embodiments as defined by the claims may include some or all of the features in these examples alone or in combination with other features described below, and may further include modifications and equivalents of the features and concepts described herein.

Figure 1:
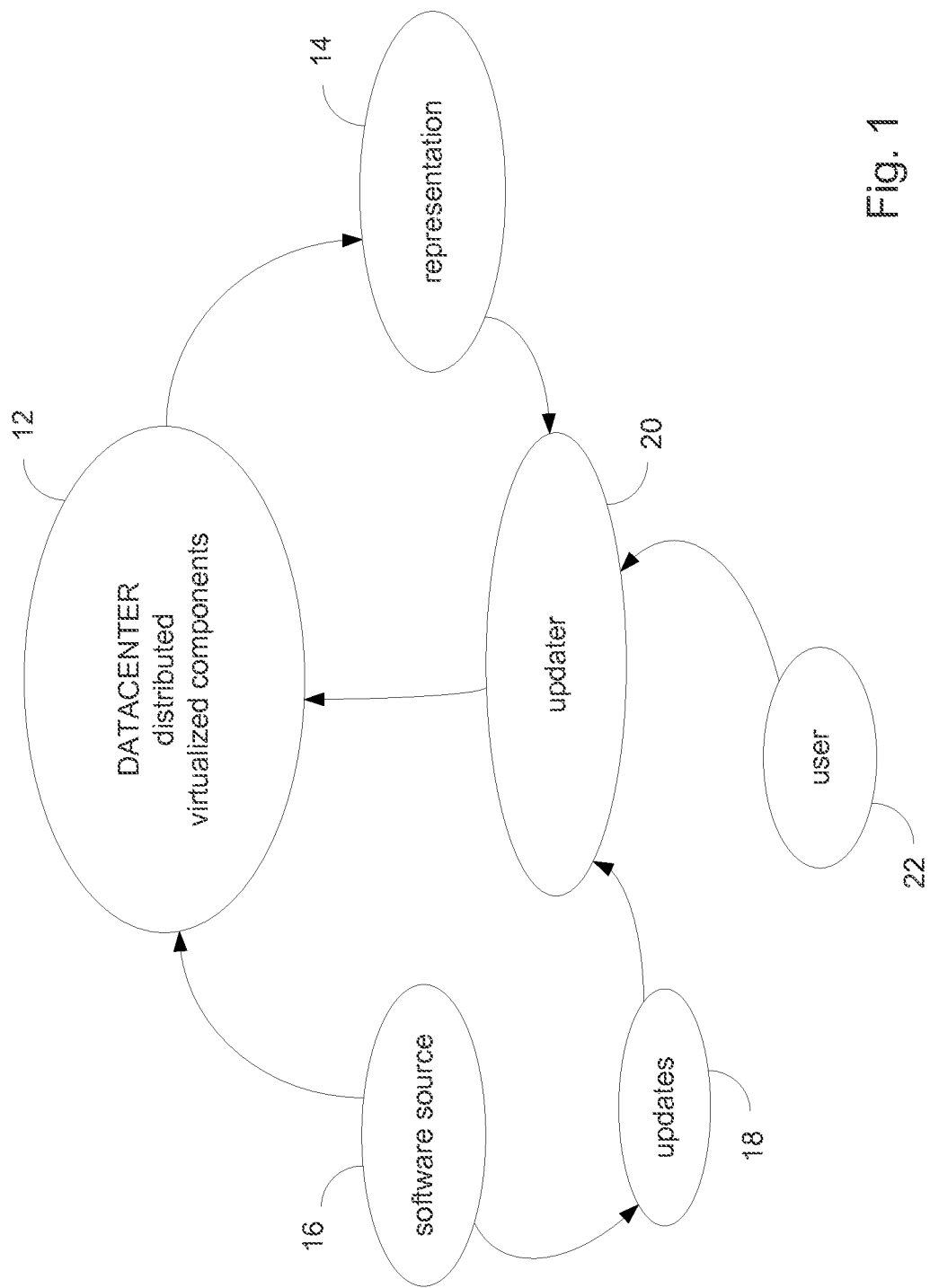
FIG. 1 represents a high level overview of software component management in accordance with principles of the present invention.

FIG. 1 provides a high level overview of software component management in accordance with the disclosed embodiments. The term "software component" as used herein will be understood to refer generally to any component of software that can be deployed in a datacenter. For example, a software component may be the initial installation of software in a component of the datacenter, such as user-level applications, OS-level applications, drivers, firmware, and the like. A software component may refer to upgrades to installed software, such as version upgrades which may replace all or some parts of a software installation, feature addition, patches, and the like.

The term "change" and its various grammatical forms used in connection with software components will be understood to refer to installing a software component (e.g., new installation, upgrades to existing installed software etc.) and to removing a software component (e.g., removing installed software, downgraded to a lower version, removing a patch, etc.). The remaining discussion generally refers to installation of a software component as an example. However, it will be appreciated that embodiments apply equally to changes in the software components that include removing the software component.

Referring to FIG. 1, a datacenter 12 includes a configuration of distributed computing components that are the subject of software component management. The datacenter 12 may include physical servers, storage devices, and network communication equipment. The datacenter 12 may further include virtualized components that provide one or more virtual environments. A representation 14 of the datacenter 12 may be provided. In embodiments discussed below, dependencies among the components of the datacenter 12 include dependencies involving components of the one or more virtual environments. A software source 16 represents a source of software components that may be deployed in the datacenter 16. Typical software sources 16 may include software vendors external to the datacenter 12 who, for example, may provide access to their software over the Internet. A software source 16 may include an engineering support group within the datacenter 12, and so on. An update store 18 may be provided to store the software components to be later deployed in the datacenter 12. The software source 16 may provide probes that can discover new components in the datacenter 12 and update the representation 14. An updater 20 may coordinate management activity with the datacenter 12. A user 22 (e.g., an IT administrator) may access the updater 20 to deploy software components to the datacenter 12.

Figure 1A:
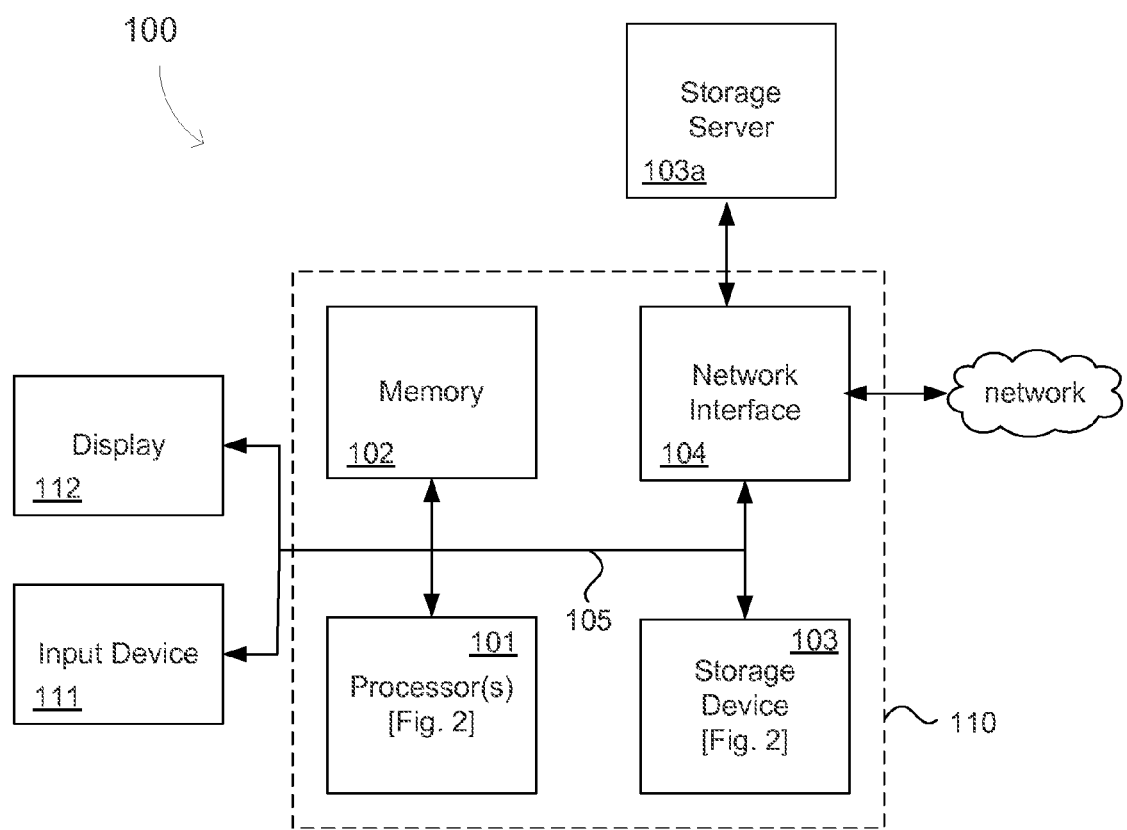
FIG. 1A illustrates a hardware embodiment.

Referring to FIG. 1A, an embodiment of the updater 20 include a software component management server 100. In particular embodiments, the server 100 may facilitate the management of datacenters which include physical components (servers, data stores) that support virtualized environments. The server 100 may learn about and build a representation of the datacenter that allows a user (IT administrator) to make queries about the datacenter and to make changes to the datacenter.

The software component management server 100 may include a computer 110 connected to I/O devices, such as display 112 and suitable input device(s) 111 such as a keyboard, a mouse, and so on. The computer 110 may include a processor component 102 that includes a processor or a configuration of many processors. A memory component 102 may include dynamic memory (e.g., DRAM) and static memory (e.g., flash memory) to store suitable computer programs that cause the processor component 101 to perform steps disclosed herein. A storage device component 103 may provide read/write-able mass storage capability (e.g., hard disk drives) and/or read-only storage (e.g., CD discs). The computer 110 may be connected to a storage server 103a via a suitable network interface component 104 for communication over a suitable communication network, such as a local network or a public access network. Users may access the server 100 locally via I/O devices 111, 112, or remotely via the communication network. A system bus 105 may provide control and/or data bus lines to interconnect these elements.

Figure 2:
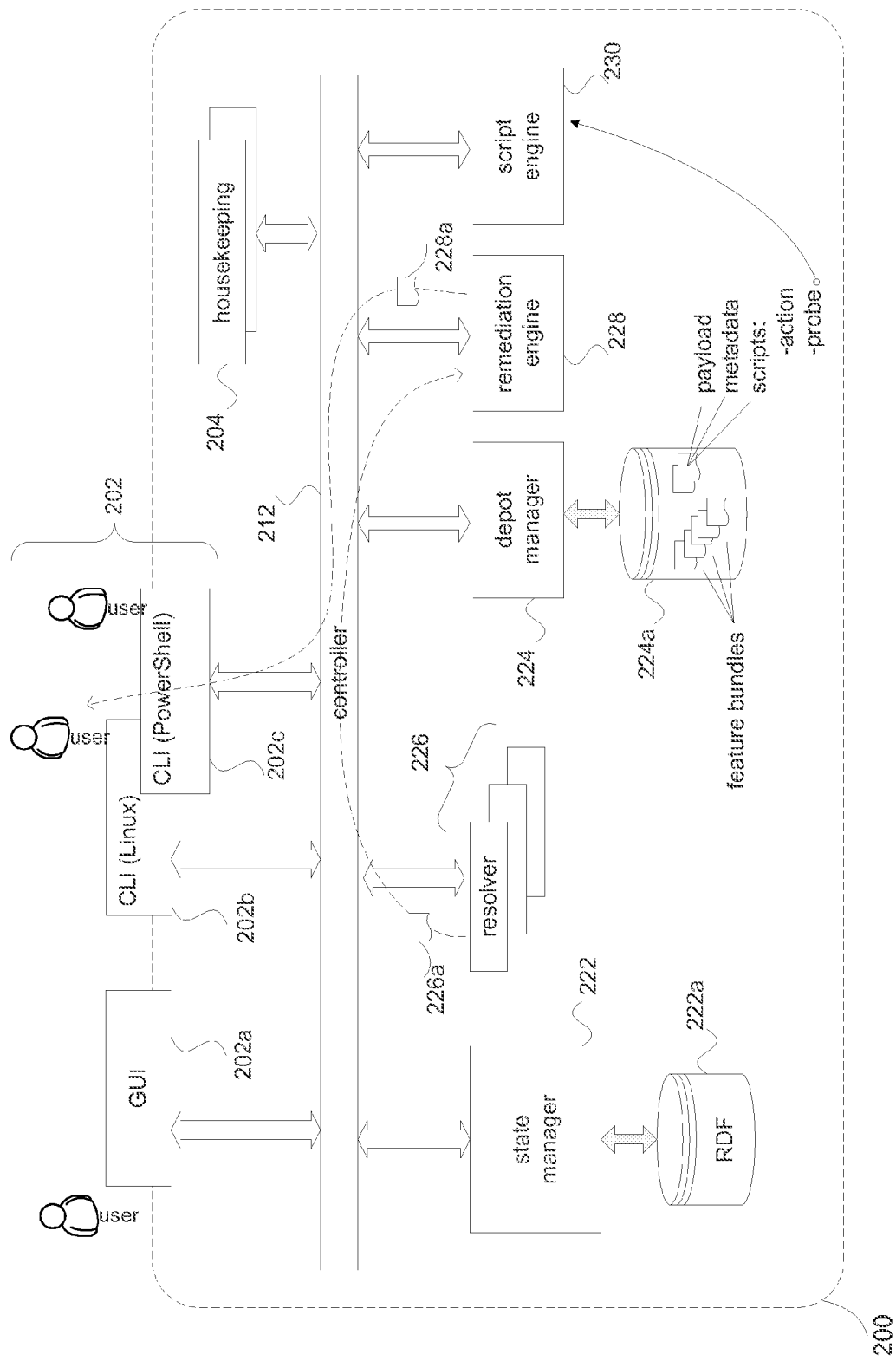
FIG. 2 illustrates processes and data stores in accordance with an embodiment of the present invention.

In embodiments, the software component management server 100 may include a plurality of processes (server processes) that execute on the processor component 101. Referring to FIG. 2, the server processes may execute on top of an operating system (OS) 200, such as Unix, or Windows® OS, and so on. Various implementations of user interfaces (UI's) 202 may be provided in order to access the server 100, including a graphical UI (GUI) 202a or a command line interface (CLI) 202b, 202c. Any suitable programming language may be used to develop the GUI 202a. For example, the GUI 202a may be a cross-platform GUI, a more traditional command line interface (CLI, also referred to as a shell program) may be provided to access the server 100. For example, on a Windows® OS, a PowerShell program may be a suitable CLI. On a Linux system, a variety of shell programs are available. The UI's 202 may provide suitable controls such as drop-down menus (in the case of a GUI) and commands (in the case of a CLI) that allow the user to access software component management services provided by the server 100 such as making queries relating to the datacenter and initiating activities relating to software upgrades in the datacenter.

The UI processes 202 may be spawned on demand by the user. For example, the software component management server 100 may host an "IT admin" web site that serves as the entry point to the GUI 202a. When the user visits the web site, the GUI 202a process may be executed to provide software component management services to the incoming user. The UI processes 202 may execute as a background process (referred to in Unix parlance as a "daemon"). For example, the CLI's 202b, 202c may be a secured login shell program that is running on the server 100. The user may access the server 100 via the login shell program, thus gaining access to the software component management services.

A controller process 212 serves as a locus for communication among the various server processes of the software component management server 100. The controller process 212 is responsible for exposing a public application programming interface (API) for the GUI 202a and CLI's 202b, 202c. For example, the API interface may be a web service based on a design principle known as REST (representational state transfer) and written, for example, using WSDL (web services description language), SOAP (simple object access protocol), or other web service language. The controller process 212 may provide translation of the API to the semantics of the underlying handler processes, as well as the routing and messaging of requests within the server 100. Incoming requests from the UI's 202 may be received and parsed, and then dispatched to the appropriate handler process or processes. In embodiments, the controller process 212 may itself be a process in the OS and spawned as needed, and then exit after an idle period of time.

A state manager 222 stores a representation of the datacenter managed by the software component management server 100. In embodiments, the representation informs the server processes of the various hardware components and software components that constitute the datacenter. Moreover, dependency relationships among hardware components and software components are represented, and may include dependency relationships among multiple instances of physical servers, various software packages installed in each physical server, the versions of those multiple software packages, virtualized elements, and so on. As an example, suppose a physical server is running a particular version of a virtualization layer. Suppose further that the virtualization layer has instantiated some number of virtual machines, that each virtual machine runs a particular OS, and that each OS requires a specific set of drivers. Various dependent relationships may exist; for example, the virtualization layer may only be suitable (i.e., "depend on") for a particular hardware version of the physical server, or may require (i.e., "depend on") some minimum memory configuration of the physical server. The OS may depend on the virtual machines being able to provide a specific version of virtual hardware, which in turn may depend on the physical server, and so on.

The data construct used to represent a datacenter may be a dependency graph. In embodiments, descriptors in the dependency graph may represent components of the datacenter (servers, data stores, software, and so on) as "nodes" in the graph, and the dependency relationships between components as "edges" in the graph. In a particular embodiment, the descriptors use a representational form known as the resource description framework (RDF) to represent the dependency graph, although representational forms other than RDF may be used; for example, adjacency matrices, relational database tables, and the like. The state manager 222 maintains an RDF data store 222a which stores a representation of the datacenter in RDF data units called "triples". An RDF triple includes a subject, an object, and a predicate that relates subject and object. Accordingly, the nodes in the dependency graph correspond to the subject and object attributes in the RDF triples, and edges in the dependency graph correspond to the predicates.

A depot manager 224 stores, registers, and otherwise manages the software components that may be installed in the datacenter, including new installations, upgrades, feature additions, patches, and so on. The depot manager 224 may obtain new versions of software components for subsequent installation in the datacenter. For example, the depot manager 224 may periodically communicate with each software vendor (e.g., via vendor web sites) to check if new software components are available. IT personnel may upload software components to the depot manager 224, and so on. The software components may be stored in a depot data store 224a.

In embodiments, each software component (referred to herein as the "payload") that may be delivered and installed in the datacenter may be wrapped in a logical package (referred to herein as a "feature bundle") along with metadata and one or more scripts (action scripts, probe scripts). The payload, the metadata, and the one or more scripts are logically collectively referred to as the feature bundle and may be stored in the depot data store 224a as a single file, or as separate files.

The payload in a feature bundle may be any kind of data that may need to be installed in the datacenter. In an embodiment, the payload is software; however, the payload may be data instead of computer instructions. For example a "data" payload may be data that specifies a new database schema to re-configure an existing database, or data use to configure the operation of an application, and so on. In the case of software payloads, the software may be user-level applications, background programs, device drivers, firmware, software patches, and so on. The software may be in any suitable data format, such as binary code, WAR (web application archive) files for Java applications, OVF (open virtual format) files for virtual appliances that execute on virtual machines, TAR (tape archive) files, and so on. The payload may be platform neutral (e.g., Java WAR files, and the like). The payload may be specific to a particular component in the datacenter; e.g., firmware specific to a particular version of a disk storage system. A feature bundle may include multiple payloads and suitable metadata and scripts to support different targets, and so on.

In embodiments, the metadata in a feature bundle may include any information that may be used to describe the relationship of its payload with other components in the datacenter to facilitate compatibility determinations. For example, the metadata may include a list of compatible versions of the components that the payload is intended to interact with. The metadata may describe required configurations or settings of the components, and so on. As an example, consider a feature bundle containing a device driver X as its payload. The associated metadata may indicate that the device driver may operate with storage devices having firmware versions 2, 3, and 3.2. The metadata may also indicate that the device driver will only work with storage devices having a maximum storage capacity of 500 GB. The metadata may provide conditions or other predicate information specifying how, when, and whether upgrade activities may be performed on a target component, whether a software component may be downgraded to an earlier version, and so on. The metadata is typically created by the author of the feature bundle. In an embodiment, however, the IT administrator may have access to the metadata in order to add datacenter-specific constraints. For example, the IT administrator may include temporal constraints in the metadata, such as specifying when a target may be taken down. Conditions for when a target can be taken down may be specified in the metadata, and so on.

The feature bundle may include one or more "scripts". These are programs that are separate from the payload and are employed to perform various tasks relating to the payload in the feature bundle, and may be used to maintain the dependency graph. In embodiments, the software component management server 100 may define a scripting framework that may be exposed to software vendors to facilitate development of suitable scripts to integrate their software components with the datacenter without having to burden the IT administrators in the datacenter with such tasks. The terms "software vendor" and "vendor" may refer to third party commercial providers of the software, to engineering and support staff employed by the datacenter who might develop and deploy software to the datacenter, and so on; basically, any supplier of software components for deployment in the datacenter may be referred to as a vendor.

One class of scripts is referred to as "action" scripts. Typically, action scripts are provided by the software vendor since the vendor is likely to know precisely what steps and sequence of steps are needed to properly install the payload in a target, which may involve installing a new version of software, upgrading a portion of the software, patching the software, and so on. An action script may be provided to uninstall the payload. Still another action script may be provided to control the target to perform a dry run of the newly installed payload, to configure the target after the installation, and so on.

Another class of scripts is called "probe" scripts. In an embodiment, probe scripts allow a feature bundle to add new node types and instances of those node types as well as edges to the dependency graph, thus extending the data graph's representation of the datacenter to include additional components in the datacenter. For example, suppose a datacenter is configured with storage devices called SANs (storage area network) and that there is presently no representation of SANs in the dependency graph of the datacenter; this situation may arise, for example, if the SANs are newly installed and the dependency graph was not updated. Suppose further that a software upgrade requires knowledge about SANs as an integral part of its dependency calculations. A suitable probe script may be provided to define a new node type in the dependency graph to represent SANs. The probe script may include logic (e.g., executable instructions, script language, etc.) to discover all SAN instances in the datacenter. For each SAN, the probe script may generate as many RDF triples as needed to adequately describe the SAN and its dependency relation with other components in the datacenter, and store those triples in the RDF data store 222*a*. In this way, the dependency graph may be dynamically extended.

A resolver 226 may receive a user request to perform a task in the datacenter. The task may be a request to change a software component such as installing a software component (e.g., new installation, an upgrade, etc.) or removing a software component (e.g., downgrading to a lower version). In embodiments, user queries may be expressed in an RDF query language called SPARQL. The resolver 226 processes the query against the RDF data store 222*a* by communicating with the RDF data store to obtain one or more RDF triples relating to the user request, and using metadata in the feature bundles associated with the nodes identified by the retrieved triples to resolve the query. An output of the resolver 226 is a target graph 226*a*, which constitutes those components in the datacenter that are affected by the requested task. In embodiments, the resolver 226 may identify targets, based on the resulting target graph 226*a*, that also require change(s) as a consequence of the requested task. For example, if the user requests target 1 should be upgraded from version X to Y, the resolver 226 may discover that target 2 must also be upgraded from version B to C to maintain compatibility. A more detailed description of processing in the resolver 226 is given below.

A remediation engine 228 may generate a workflow 228*a* in response to a user request to perform a task. As explained, the resolver 226 may produce a target graph 226*a* in response to receiving the requested task that identifies at least the target of the requested task and zero or more components that are affected by the requested task. The resolver 226 may pass the target graph 226*a* to the remediation engine 228 to generate the workflow. In embodiments, the workflow 228*a* includes the action scripts contained in the feature bundles.

In embodiments, input to the remediation engine 228 for workflow generation is the target graph 226*a*, containing a list of target nodes. Transformation of the target graph 226*a* into a workflow may include accessing the feature bundle from the depot data store 224*a* corresponding to the upgrade information associated with a node in the target graph. The remediation engine 228 may use the metadata in the feature bundle to determine if the upgrade may be performed on that node. For example, the metadata may inform that version X can be upgraded directly to version Z, or that version Y must first be installed in order to upgrade from version X to version Z. If the upgrade is permitted, then the remediation engine 228 may incorporate the action script from the feature bundle into the workflow 228*a*. A complete workflow 228*a* may be compiled by repeating the foregoing for each node in the target graph 226*a*. Processing in the remediation engine 228 will be discussed in more detail below.

A script engine 230 may perform the general task of executing scripts. As explained above, the resolver 226 may produce a target graph 226*a* in response to receiving a task request from the user. The remediation engine 228 may produce a workflow 228*a* from the target graph 228*a*. The script engine 230 may process action scripts in the workflow 228*a* to effect the requested task. For example, the script engine 230 may coordinate with the remediation engine 228 to sequentially execute each action script in the workflow 228*a*.

In embodiments, the script engine 230 may execute the probe scripts contained in each feature bundle stored in the depot data store 22*a*. For example, the script engine 230 may access each feature bundle in sequence, obtain the probe script, and execute it. Some probe scripts may be executed concurrently. Instructions that constitute the probe script may interact with a component in the datacenter to learn about its configuration. The probe script may then assemble that information into one or more RDF triples, and then communicate the triples to the state manager 222 for storage in the RDF data store 222*a*. In this way, the dependency graph of the datacenter may be automatically updated, and extended as new components are discovered.

The controller process 212 may employ a set of housekeeping tasks 204. These tasks 204 may be scheduled entities using the underlying primitives of the OS to execute at a particular time (e.g., cron on Linux or Task Scheduler on Windows). These tasks 204 may provide caching of metadata for various feature bundles packages, purging stale targets from the RDF data store, and so on.

Figure 3:
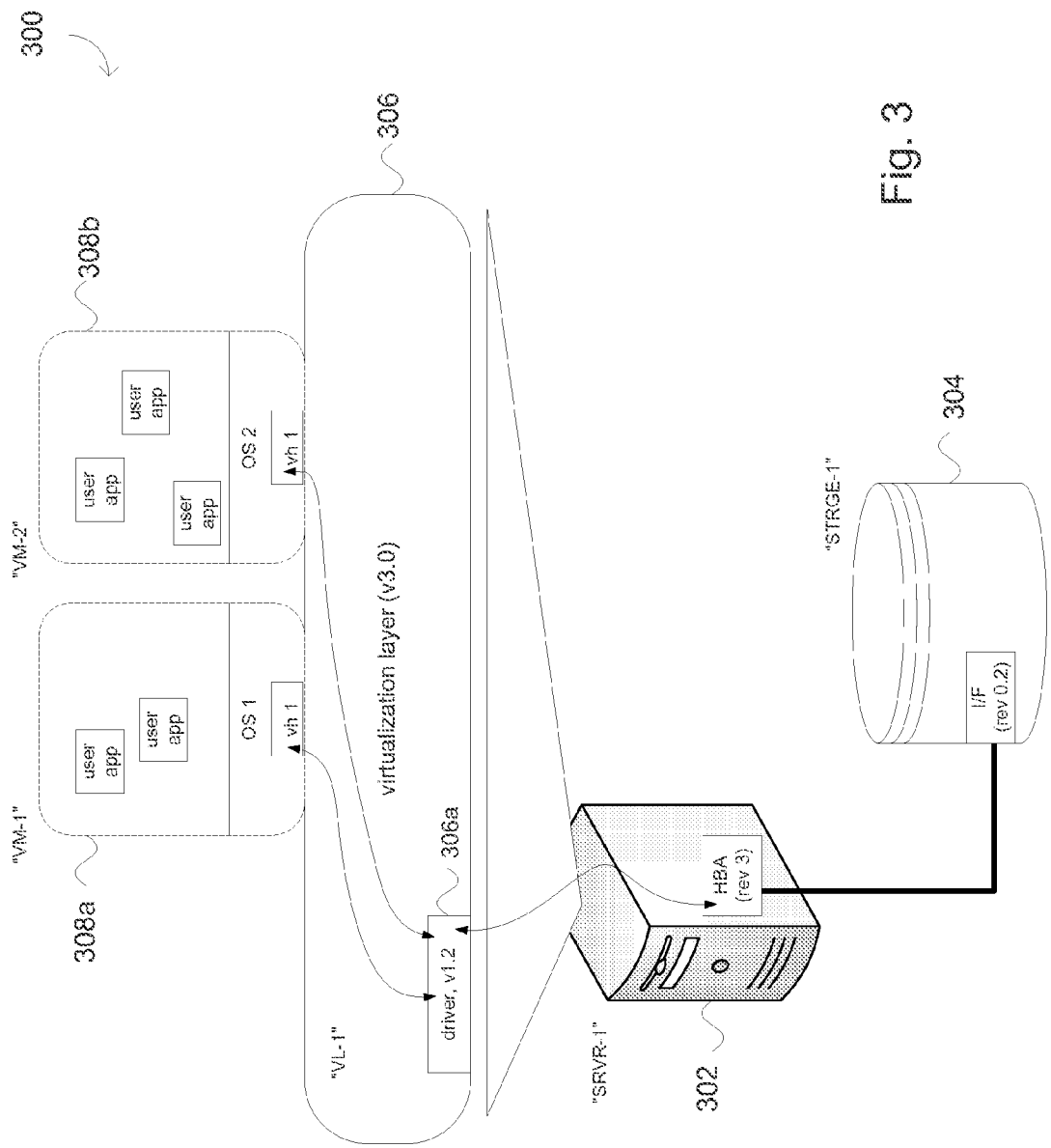
FIG. 3 represents an example of a datacenter having a virtual environment.

FIG. 3 represents a datacenter 300 that incorporates a virtual environment to illustrate how a dependency graph may be represented in an embodiment. As explained above, the dependency graph may be expressed in RDF notation. The RDF unit of data is a triple including: a subject, a predicate, and an object. A predicate signifies the dependency relationship between a subject and an object. The datacenter 300 shown in FIG. 3 includes a physical layer having a physical server 302 (identified as "SRVR-1") and a data storage system 304 (identified as "STRGE-1"). The physical server 302 includes a host bus adaptor (HBA) for connection with an interface circuit (I/F) in the data storage system 304. The software layer includes virtualization layer 306 (identified as "VL-1") that executes directly on the physical server 302. A driver 306a operates with the HBA in the physical server 302. The virtualization layer 306 has two instances of virtual machines 308a, 308b, each of which runs a separate OS. Each OS uses drivers that work with virtual hardware ("vh 1") presented by the respective virtual machines 308a, 308b.

TABLE I is a partial representation of a dependency graph for the datacenter 300 using RDF notation.

TABLE I

| SUBJECT | PREDICATE | OBJECT |
|---|---|---|
| | RDF Triples | |
| SRVR-1 | has | HBA, rev 3 |
| SRVR-1 | hosts | VL-1 |
| SRVR-1 | connected to | STRGE-1 |
| STRGE-1 | has | I/F, rev 0.2 |
| STRGE-1 | connected to | HBA, rev 3 |
| VL-1 | has version | v3.0 |
| VL-1 | has | driver, v1.2 |
| VL-1 | has | 2 instantiations |
| VL-1 | instantiates | VM-1 |
| VL-1 | instantiates | VM-2 |
| VL-1 | executes on | SRVR-1 |
| VM-1 | presents | vh 1 (VM1) |
| VM-1 | runs | OS 1 |
| OS 1 | uses | vh 1 (VM1) |
| VM-2 | presents | vh 1 (VM2) |
| VM-2 | runs | OS 2 |
| OS2 | uses | vh 1 (VM2) |
| HBA, rev 3 | connected to | STRGE-1 |

Figure 3A:
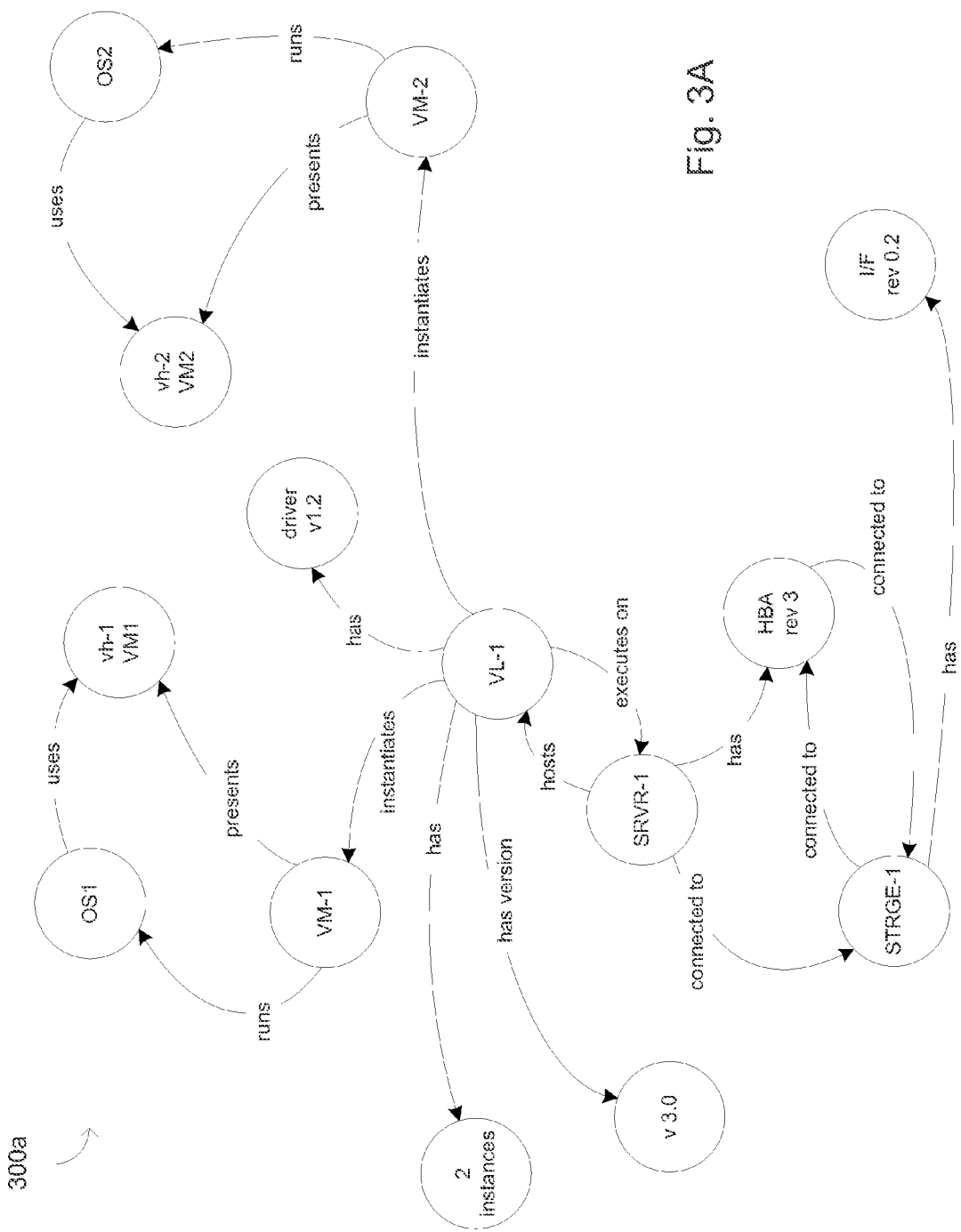
FIG. 3A is a dependency graph representative of the datacenter shown in FIG. 3.

FIG. 3A illustrates the dependency graph 300a represented by the triples in TABLE 1. The subject and object entries in the table correspond to nodes in the dependency graph 300a, and the predicate entries in the table correspond to the edges between nodes.

In an embodiment, dependency relationships among components that include a virtual environment in a datacenter may be represented. In FIG. 3, for example, the virtual layer 306 instantiates two instances of virtual machines 308a, 308b. TABLE II represents this fact with the following triples:

TABLE II

| SUBJECT | PREDICATE | OBJECT |
|---|---|---|
| VL-1 | has | 2 instantiations |
| VL-1 | instantiates | VM-1 |
| VL-1 | instantiates | VM-2 |

It was explained above that the resolver 226 may receive a user request to perform a task. In embodiments, a task request may specify an action and a target. The "target" identifies a component in the datacenter on which the action is to be performed. The resolver 226 may resolve the request by "walking" the edges of the dependency graph, and identifying components that may be affected (conflicts) and attempt to resolve any conflicts.

Figure 4:
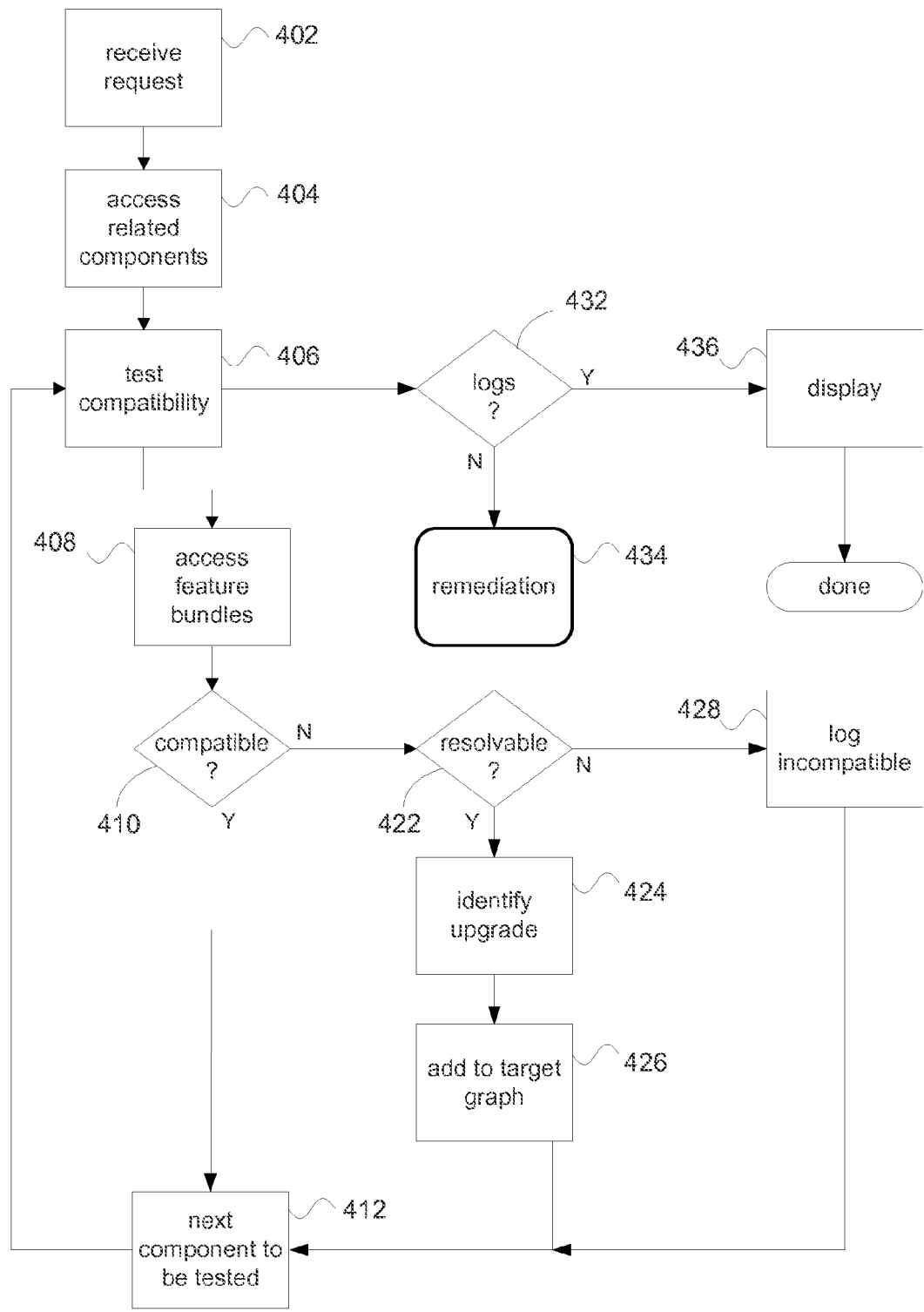
FIG. 4 is a high level process flow for resolving user requests in accordance with embodiments of the present invention.

A discussion of high level processing steps for the resolver 226 will be given in connection with the flow shown in FIG. 4 and in the context of the following example taken from FIG. 3. Suppose a new driver is available for the virtualization layer 306 to replace the currently installed driver 306a (at version v1.2). Accordingly, in a step 402, the resolver 226 receives a request to make a change to a software component, namely the installed driver 306a. The request may specify (1) the target, namely "driver v1.2" in the dependency graph; (2) the desired change (e.g., "install"); and (3) the feature bundle that contains the new driver.

In a step 404, the resolver 226 identifies all the components that have a dependency relationship with the target. Thus, in our example, the resolver 226 may access RDF data store 222a to retrieve all RDF triples in which the target, namely "driver v1.2", appear as either the source in the triple or the object in the triple, as depicted in TABLE III:

TABLE III

| SUBJECT | PREDICATE | OBJECT |
|---|---|---|
| VL-1 | has | driver, v1.2 |

TABLE III identifies components that have a dependency relationship with "driver v1.2". For example, the table informs that the virtualization layer 306 includes the driver 306a.

Next, the resolver 226, in a loop 406, tests the compatibility between the target and each of the components identified in step 404. Accordingly, in a step 408, the resolver 226 may access the depot data store 222a to call up the feature bundle for the currently installed driver 306a, the feature bundle for the proposed new driver, and the feature bundle for the currently installed HBA component (the first component to be tested). In a decision step 410, compatibility between the currently installed HBA and the new driver may be determined from information conveyed in one or more RDF triples that relate driver 306a and HBA, the metadata contained in the feature bundles for the proposed new driver, the currently installed driver, the currently installed HBA, and so on. For example, the metadata contained in the feature bundles may provide information about what version (or versions) of the HBA that the new driver will work with. Suppose for example, the metadata in the feature bundle for the new driver indicated that the new driver is compatible with HBA rev 4 or higher. Using the metadata information and the triples (TABLE III) obtained from the RDF data store 222a, the resolver 226 may determine that the currently installed HBA component in the physical server 302 (namely, HBA rev 3) would be "affected" by virtue of being at the wrong rev level, and thus incompatible with the new driver.

If the outcome of step 410 is positive (i.e., the upgrade to the target is compatible with the component being tested), then in a step 412 the loop is repeated in order to test the next component identified in step 404.

If the outcome of step 410 is negative (i.e., the upgrade to the target is not compatible with the component being tested and so a conflict arises), as is the case for the HBA in the running example, then an inquiry may be made in a step 422 as to whether the conflict may be resolved. For example, the metadata for the new driver identifies compatible revs of the HBA. The inquiry made in step 422 may involve the resolver 226 searching the depot data store 224a for any firmware upgrades that may bring the HBA to a compatible rev level.

If the outcome of the inquiry 422 is that the conflict between the component being tested and the target cannot be resolved, then this fact may be logged in a result buffer, step

424. In the running example, if the rev level of the HBA cannot be upgraded, then information relating to this fact may be logged in the result buffer. Processing may then proceed with the next component, step 412.

If the outcome of the inquiry 422 is that the conflict may be resolved, then in a step 424 a node may be added to the target graph, identifying the current state of the component being tested and a desired state. In the running example, if a firmware upgrade for the HBA is available, then the resolver 226 may add a node in the target graph identifying the current state of the HBA and the new rev level for the HBA. Processing may then proceed with the next component, step 412.

When the loop 406 has completed, a determination (step 432) is made whether any conflicts were logged at step 428. If conflicts were logged, then the resolver 226 may display (step 436) suitable error messages to the IT administrator indicating the conflicting components, what the conflicts were, and so on. Processing of the requested task may then be aborted. In embodiments, the IT administrator may inform the system to nonetheless proceed with the requested change to the software component because, for example, they may have knowledge about the system that allows them to make an informed decision to proceed with the change despite the identified conflicts.

If the determination in step 432 indicates that no conflicts were identified, then the processing of the requested task may proceed. Accordingly, the resolver 226 may pass the target graph onto the remediation engine in a step 434.

Figure 5:
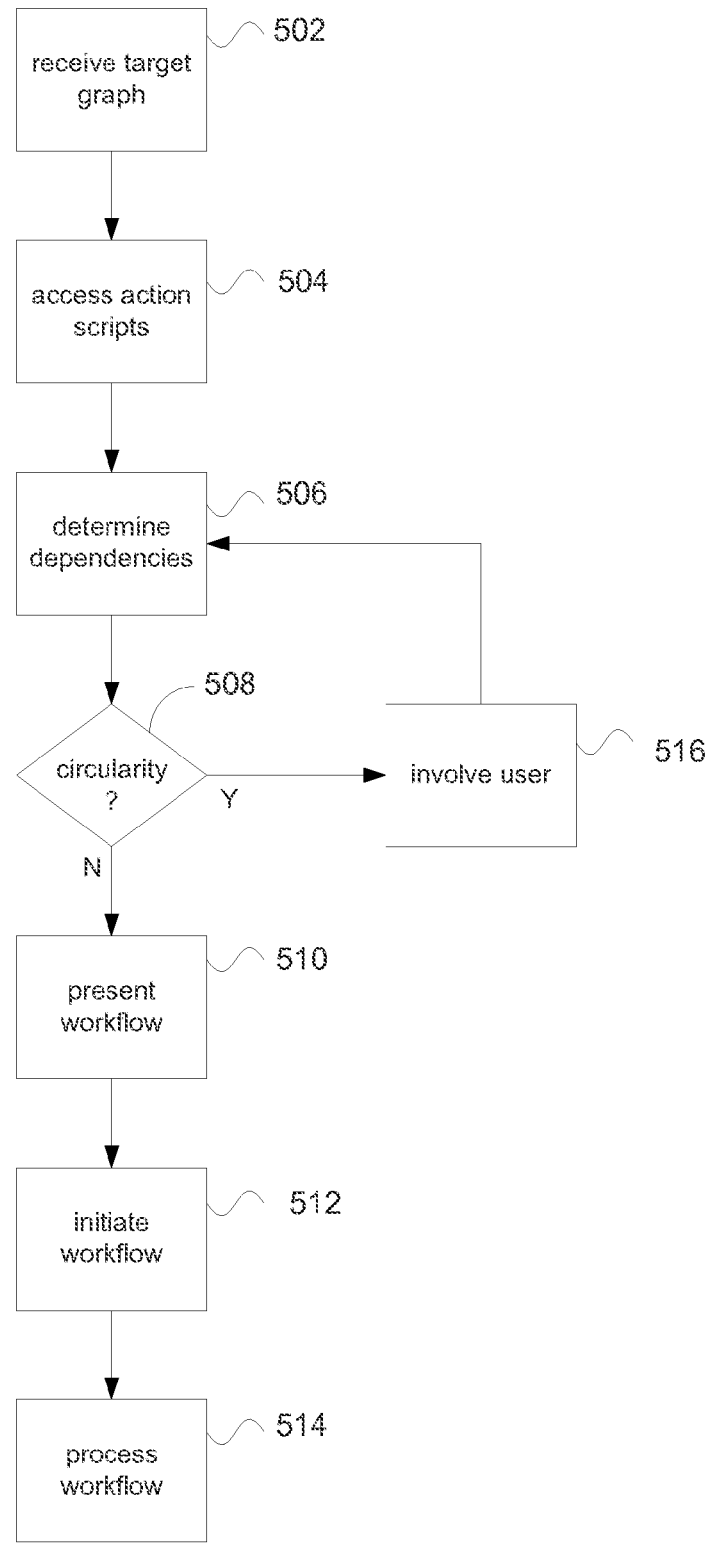
FIG. 5 is a high level process flow for remediation of action scripts in accordance with embodiments of the present invention.
Figure 6:
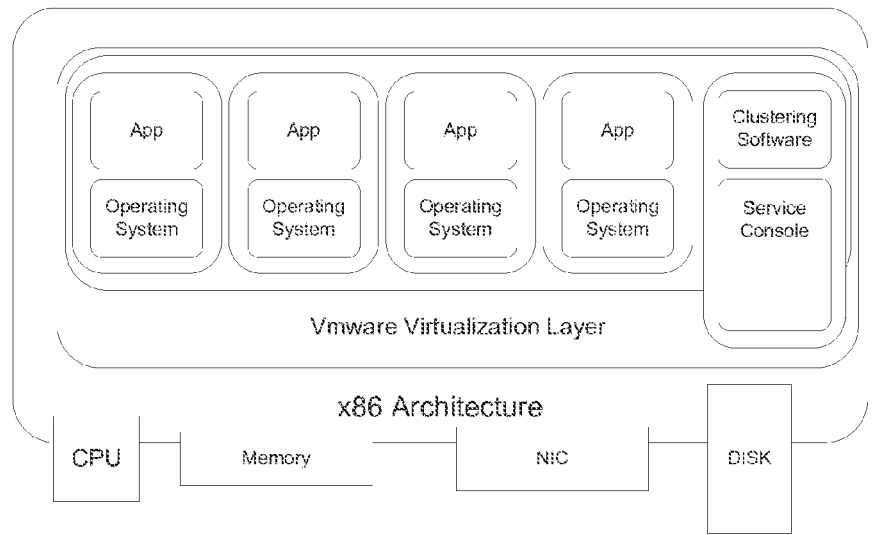
FIG. 6 illustrates an example of a virtualized architecture.
Figure 7:
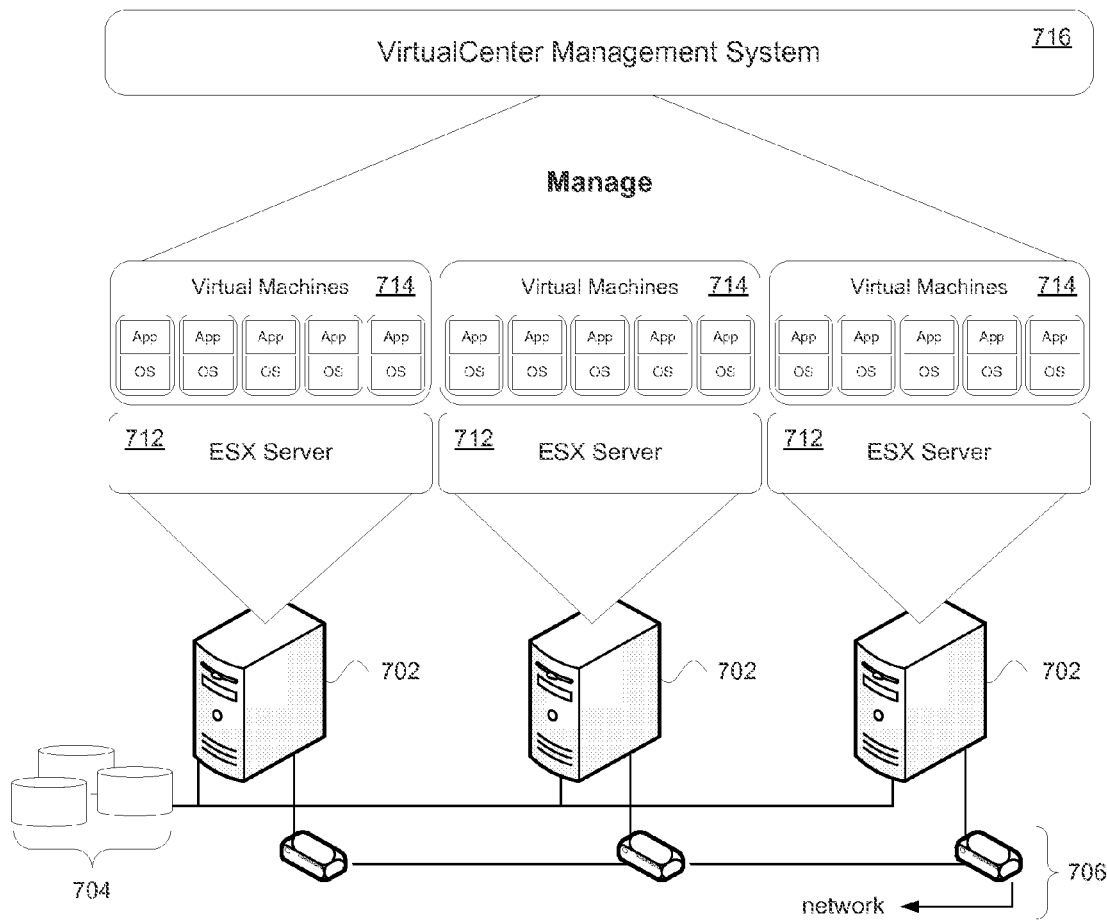
FIG. 7 illustrates an example of a virtualized architecture.

As explained above the remediation engine 228 generates a workflow from the target graph received from the resolver 226. Referring to FIG. 5, in an embodiment, the remediation engine 228 receives the target graph from the resolver 226 in a step 502.

The target graph may be transformed into a workflow by retrieving the feature bundle action scripts from the depot data store 224*a*. For each node in target graph, the feature bundle action script provides the remediation actions, with ordering information if necessary for the feature bundle. Each action script may specify pre and/or post remediation actions; e.g., download the binary files, staging, entering maintenance mode, reboot, etc.

In an embodiment, the transformation from target graph to workflow needs two passes to the feature bundle action scripts. In a step 504, a first pass is made where the feature bundle for each node in the target graph is retrieved from the depot data store 224*a*. The action script from each retrieved feature bundle is accessed to obtain the actions for each target node remediation, and compiled into a workflow.

In a step 506, a second pass is made to identify any dependencies between different target nodes and different feature bundles. For example, low level device drivers may need to be installed before installing application level software.

In embodiments, the remediation engine 228 may detect circular dependencies in the workflow. In a step 508, if any circularities are detected, then in step 516, the ordering needed to resolve the circularities may be provided by the user. In a step 510, after any circularities have been resolved, the remediation engine 228 may present the compiled workflow to the user, thus completing the workflow generation stage of processing in the remediation engine 228.

The user may review the generated workflow and specify remediation options for the workflow (e.g. scheduling, maintenance mode options, etc.). Alternatively, the user may specify the remediation options independently for each action and each node.

After the user specifies the remediation options for the workflow, the remediation engine 228 may receive a request (step 512) from the user to initiate the workflow. In a step 514, the remediation engine 228 may maintain an action queue and initiate (via the script engine) the execution of each action, and monitor the execution conditions for each action. Upon completion of the action scripts in the workflow, processing of the user's requested task may be deemed to be have concluded.

Various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Various embodiments described herein may be practiced with other computer system configurations including handheld devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that may store data which may thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs), a CD-ROM, a CD-R, a CD-RW, a DVD (Digital Versatile Disc), a magnetic tape, and other optical and non-optical data storage devices. The computer readable medium may also be distributed over a network coupled computer system so that the computer readable code is stored and executed in a distributed fashion.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how they may be implemented. The above examples and embodiments should not be deemed to be the only embodiments. Based on the above disclosure and the following claims, other arrangements, embodiments, implementations and equivalents may be employed without departing from the scope of the invention as defined by the claims.

What is claimed is:

1. A method of managing software in a datacenter comprising operating a computer to perform steps of:
   storing a data construct representative of at least a portion of a datacenter having a distributed computer architecture, the data construct comprising a first component portion, a second component portion, and a relating portion, the first component portion comprising a first list of components within the datacenter, the second component portion comprising a second list of components within the datacenter, and the relating portion comprising a list of dependencies that signify a relationship between each component in the first list of components and a corresponding component in the second list of components;
   receiving a request to change software on a target component in the datacenter;
   receiving target information representative of the target component;
   receiving a software bundle that includes the software to be installed on the target component, metadata that includes information used to describe a relationship between the software and components, and one or more probe scripts that discover a component dependency not listed in the relating portion;
   updating the list of dependencies to include the component dependency not listed in the relating portion;
   identifying, by a processor, the target component within at least one of the first component portion and the second component portion;
   identifying, within the relating portion, one or more dependencies that associate the target component with one or more other components listed within at least one of the first component portion and the second component portion, the one or more dependencies including the component dependency discovered by the one or more probe scripts;
   using the metadata and the identified one more dependencies to identify, by the processor, any affected components from among the one or more other components listed within at least one of the first component portion and the second component portion, wherein the affected components reflect a set of possible conflicts that occur due to the installing of the software;
   when the set of possible conflicts cannot be resolved, outputting information for the set of possible conflicts that cannot be resolved for one or more of the affected components; and
   when the set of possible conflicts are resolvable, enabling the change of the software to be performed on the target component.

2. The method of claim 1, further comprising receiving task information representative of a desired change for the target component for installing software on the target component, and wherein the method further comprises using at least the task information to further identify the affected components.

3. The method of claim 2, wherein the affected components reflect a set of possible conflicts that occur due to the installing of the software.

4. The method of claim 1, further comprising adding the affected components to a data structure that includes the identified dependencies to allow the change of the software to be performed on the target component.

5. The method of claim 4, further comprising:
   transforming the data structure into a workflow that enables changes to the software on the target component by:
      obtaining a set of action scripts from a set of feature bundles associated with the affected components, wherein the set of action scripts is added to the workflow based on the dependency relationships; and
      remediating the affected components to resolve the set of possible conflicts by executing the action scripts in the workflow, each action script performing an action to resolve the possible conflicts.

6. The method of claim 1, further comprising receiving input from a user indicating whether or not to proceed with installing the software component when one or more affected components are identified.

7. The method of claim 1, wherein when the set of possible conflicts are resolvable, receive a request from a user to enable the change of the software to be performed on the target component.

8. The method of claim 1, wherein the metadata identifies the target component as needing an update prior to installing the software.

9. A system for managing software in a datacenter, the system comprising:
   memory for storing a data construct representative of at least a portion of a datacenter having a distributed computer architecture, the data construct comprising a first component portion, a second component portion, and a relating portion, the first component portion comprising a first list of components within the datacenter, the second component portion comprising a second list of components within the datacenter, and the relating portion comprising a list of dependencies that signify a relationship between each component in the first list of components and a corresponding component in the second list of components; and
   a processor programmed to:
      receive a request to change software on a target component in the datacenter;
      receive target information representative of the target component;
      receive a software bundle that includes the software to be installed on the target component, metadata that includes information used to describe a relationship between the software and components, and one or more probe scripts that discover a component dependency not listed in the relating portion;
      update the list of dependencies to include the component dependency not listed in the relating portion;
      identify the target component within at least one of the first component portion and the second component portion;
      identify, within the relating portion, one or more dependencies that associate the target component with one or more other components listed within at least one of the first component portion and the second component portion, the one or more dependencies including the component dependency discovered by the one or more probe scripts; and
      use metadata and the identified one more dependencies to identify any affected components from among the one or more other components listed within at least one of the first component portion and the second component portion, wherein the affected components reflect a set of possible conflicts that occur due to the installing of the software;
when the set of possible conflicts cannot be resolved, output information for the set of possible conflicts that cannot be resolved for one or more of the affected components; and
when the set of possible conflicts are resolvable, enable the change of the software to be performed on the target component.

10. The system of claim 9, wherein the processor is further programmed to:
receive task information representative of a desired change for the target component for installing software on the target component; and
use at least the task information to further identify the affected components.

11. The system of claim 10, wherein the affected components reflect a set of possible conflicts that occur due to the installing of the software.

12. The system of claim 9, wherein the processor is further programmed to add the affected components to a data structure that includes the identified dependencies to allow the change of the software to be performed on the target component.

13. The system of claim 12, wherein the processor is further programmed to:
transform the data structure into a workflow that enables changes to the software on the target component by:
obtaining a set of action scripts from a set of feature bundles associated with the affected components, wherein the set of action scripts is added to the workflow based on the dependency relationships; and
remediating the affected components to resolve the set of possible conflicts by executing the action scripts in the workflow, each action script performing an action to resolve the possible conflicts.

14. The system of claim 9, wherein when the set of possible conflicts are resolvable, the processor is further programmed to receive a request from a user to enable the change of the software to be performed on the target component.

15. The system of claim 9, wherein the metadata identifies the target component as needing an update prior to installing the software.

16. A non-transitory computer-readable storage medium having computer executable instructions embodied thereon, wherein, when executed by a processor, the computer-executable instructions cause the processor to:
store a data construct representative of at least a portion of a datacenter having a distributed computer architecture, the data construct comprising a first component portion, a second component portion, and a relating portion, the first component portion comprising a first list of components within the datacenter, the second component portion comprising a second list of components within the datacenter, and the relating portion comprising a list of dependencies that signify a relationship between each component in the first list of components and a corresponding component in the second list of components;
receive a request to change software on a target component in the datacenter;
receive target information representative of the target component;
receive a software bundle that includes the software to be installed on the target component, metadata that includes information used to describe a relationship between the software and components, and one or more probe scripts that discover a component dependency not listed in the relating portion;
update the list of dependencies to include the component dependency not listed in the relating portion;
identify the target component within at least one of the first component portion and the second component portion;
identify, within the relating portion, one or more dependencies that associate the target component with one or more other components listed within at least one of the first component portion and the second component portion, the one or more dependencies including the component dependency discovered by the one or more probe scripts; and
use the metadata and the identified one more dependencies to identify any affected components from among the one or more other components listed within at least one of the first component portion and the second component portion, wherein the affected components reflect a set of possible conflicts that occur due to the installing of the software;
when the set of possible conflicts cannot be resolved, output information for the set of possible conflicts that cannot be resolved for one or more of the affected components; and
when the set of possible conflicts are resolvable, enable the change of the software to be performed on the target component.

17. The non-transitory computer-readable storage medium of claim 16, wherein the computer executable instructions further cause the processor to:
receive task information representative of a desired change for the target component for installing software on the target component; and
use at least the task information to further identify the affected components.

18. The non-transitory computer-readable storage medium of claim 17, wherein the affected components reflect a set of possible conflicts that occur due to the installing of the software.

19. The non-transitory computer-readable storage medium of claim 16, wherein when the set of possible conflicts are resolvable, the computer-executable instructions further cause the processor to receive a request from a user to enable the change of the software to be performed on the target component.

* * * * *